(12) United States Patent
Bohacik et al.

(10) Patent No.: US 9,194,111 B2
(45) Date of Patent: Nov. 24, 2015

(54) TAILPIECE AND SINK DRAIN ASSEMBLY SYSTEM

(71) Applicants: Richard Bohacik, Barnegat, NJ (US); Robert Petner, Burlington, NJ (US)

(72) Inventors: Richard Bohacik, Barnegat, NJ (US); Robert Petner, Burlington, NJ (US)

( * ) Notice: Subject to any disclaimer, the term of this patent is extended or adjusted under 35 U.S.C. 154(b) by 134 days.

(21) Appl. No.: 14/072,893

(22) Filed: Nov. 6, 2013

(65) Prior Publication Data
US 2014/0059761 A1 Mar. 6, 2014

Related U.S. Application Data

(63) Continuation-in-part of application No. 13/894,858, filed on May 15, 2013, now abandoned.

(60) Provisional application No. 61/651,030, filed on May 24, 2012.

(51) Int. Cl.
*E03C 1/23* (2006.01)
*F16K 5/06* (2006.01)
*F16K 27/06* (2006.01)

(52) U.S. Cl.
CPC ............. *E03C 1/2302* (2013.01); *F16K 5/0652* (2013.01); *F16K 27/067* (2013.01); *E03C 2001/2315* (2013.01)

(58) Field of Classification Search
CPC ................ E03C 1/2302; E03C 1/2306; E03C 2001/2315
USPC ............................... 4/688, 691, 693
See application file for complete search history.

(56) References Cited

U.S. PATENT DOCUMENTS 6,058,526 A * 5/2000 Parisi et al. ........................ 4/688
8,037,558 B1 * 10/2011 Chen .................................. 4/689

* cited by examiner

*Primary Examiner* — Janie Christiansen
(74) *Attorney, Agent, or Firm* — Stuart M. Goldstein (57) ABSTRACT

A sink or similar fluid retaining vessel drain system employs a unique linkage assembly to control the opening and closing of a ball type valve mechanism. The system is to be utilized in a small section of pipe as a tailpiece add-on which is connected to the bottom of any standard basket drain, configured to replace the existing straight section of tailpiece pipe below the drain. The system can also be utilized as an originally installed assembly connected directly beneath the drain.

11 Claims, 9 Drawing Sheets

TAILPIECE AND SINK DRAIN ASSEMBLY SYSTEM

This application claims the benefit of application Ser. No. 61/651,030, filed on May 24, 2012 and is a continuation-in-part application of Ser. No. 13/894,858 filed on May 15, 2013.

BACKGROUND OF THE INVENTION

Sinks in general, whether kitchen, commercial, bar, utility (slop), etc. and other fluid holding vessels such as bathtubs and tanks, all use some type of drain assembly to maintain fluid and then discharge the fluid. For instance, a basket drain is commonly installed in the bottom of a sink because it is the least expensive way of stopping water from draining. In some commercial applications, a lever or twist drain is used in lieu of the simple basket drain. This not only works better (water does not leak as fast as with a basket drain), but also allows an individual to control the drain mechanism from under the sink, rather than reaching down into the water to allow it to drain. However, this is quite costly and sometimes cumbersome in comparison to the simple basket drain. Other systems require the user to stick his or her hand into a sink of hot or dirty water to allow drainage. Oft times an unsightly strainer lying sideways in the bottom of a sink is the only way to prevent accidental stoppage of the drain during normal use of the sink.

There are also numerous drain assembly designs which are controlled remotely from the drain, i.e. from above the sink, bathtub, etc. Such systems are usually unduly complicated or they are unreliable in preventing unwanted leakage through the drain or under the sink itself.

SUMMARY OF THE INVENTION

The object of the tailpiece and sink drain assembly of the present invention is to provide for an effective and efficient remote control means of retaining water or other fluids in a sink or similar vessel, and then easily discharging it from the sink's drain. Once the invention is installed, water or other fluid will be retained without leakage. The invention will prevent accidental stoppage of fluid through the drain, allowing for placement of a strainer where it belongs, within the basket drain.

These and other objects are accomplished by the present invention, a sink or similar fluid retaining vessel drain system which employs a unique linkage assembly to control the opening and closing of a ball type valve mechanism. The system is to be utilized in a small section of pipe as a tailpiece add-on which is connected to the bottom of any standard basket drain, configured to replace the existing straight section of tailpiece pipe below the drain. The system can also be utilized as an originally installed assembly connected directly beneath the drain.

Traditional systems allow water to drain even when a strainer or pop-up drain is installed properly. The ball valve design has been successfully utilized even in high-pressure applications. A very high-end ball valve designed sink drain is available for commercial sinks, but is very expensive and can only be operated with a rotary handle from under the sink. It must also be installed through the sink opening and sealed in place, whereas the present invention is a simple add-on to a new or existing sink installation.

The invention also allows for the use of a simple pop-up mechanism near or connected to the faucet (similar to small bathroom sinks) to activate the linkage assembly and hence the opening and closing of the drain. This is a unique and efficient way of controlling a drain with a positive ball valve seal. Other means of operating this drain controlled system would be through a rotary handle or lever type handle mounted under the sink, a pull or twist cable control mounted for convenience, or even a servo-motor with a remote switch. All of these controls eliminate the need to reach down into a sink of water to allow drainage and the accidental stoppage of water flow, resulting from the strainer falling into position and plugging the drain.

The invention would be available in various sizes, e.g. 1¼", 1½", or 2", plus all metric sizes for the foreign market. Material composition would include various options and combinations depending on the targeted market. These would include, but would not be limited to stainless steel, brass, plastic or zinc.

Applications would include any product that utilizes a drain, such as kitchen and bathroom sinks, slop sinks, vessels with bottom drains, e.g. bathtubs, etc. It would also be incorporated as part of any drain that would require remote control capabilities and positive sealing attributes.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Sink 1 or other fluid holding vessel has drain 2 with a standard below the drain threaded extension 6 to which a drain pipe tailpiece is routinely threaded and then attached to the remaining sink drainage system. The current invention replaces the standard drain pipe tailpiece with tailpiece drain pipe section 4 containing a unique system to remotely control the opening and closure of sink drain 2. Tailpiece 4 has connection means, e.g. threaded nut 5 to be attached to thread extension 6 of drain 2. Casing or housing 7 is provided for protection of the unit.

Tailpiece 4 comprises an elongated, cylindrical pipe shaped tubular member 10 having open top 12, open bottom 14, longitudinal vertical axis 16 and horizontal axis 18, perpendicular to the vertical axis. Ball valve 20 is located within tubular member 10 and allows for the opening and closing of tailpiece 4, and hence drain 2, through centrally located channel 21 extending through the ball valve. Ball valve 20 is mounted to tubular member 10 by rotatable shafts 22 and 24, attached between the walls of the tubular member and the ball valve. Sleeve element 26 is, at all times, seated against ball valve 20 and extends adjacent to and along the internal surface of tubular member 10. Rotatable movement of ball valve 20 within tubular member 10 is accomplished via valve controlled linkage assembly 30, actuator arm 44, and vertical movement of control rod 80 extending externally of sink 1 (See FIGS. 11 and 12).

Linkage assembly 30 comprises linkage crank member 32, fixedly attached to rotatable shaft 22. U-shaped linkage arm 34 is connected at one end to linkage crank member 32, by pin screw 36, slideably located within slot 38. The other end of linkage arm 34 is rotatably connected to linkage shaft 40, which is supported within shroud 42 extending from tubular member 10. Actuator arm 44 is fixedly attached to linkage shaft 40, such that when the actuation arm is in a horizontal position, substantially parallel to horizontal axis 18 of tubular member 10, ball valve 20 is opened, i.e. it is positioned such that its centrally located channel 21 is aligned parallel with vertical axis 16 of the tubular member, providing a completely open pathway between open top 12 and open bottom 14 of tubular member. (See FIGS. 1, 2, 5, 7, 9, and 11).

By vertically raising actuator arm 44 from this position, linkage shaft 40 rotates, which in turn rotates and slides linkage arm 34 forward. This causes linkage crank member 32 to also rotate forward, resulting in shaft 22 rotating ball valve 90°, such that central channel 21 is now aligned parallel to horizontal axis 18 of tubular member 10. In this position, top wall surface 23 of ball valve 20 extends the width of tubular member 10, between the inner surface of the tubular member. This closes ball valve 20, thereby closing drain 2. (See FIGS. 3, 4, 8, 10 and 12).

A fluid sealing system is provided to ensure that fluid flowing into the drain does not leak through ball valve 20 or leaks from the sink to the exterior of tubular member 10. The sealing system, best seen in FIG. 5, comprises O-ring 60 positioned within notched opening 28 of sleeve element 26. Washer 62 overlays O-ring 60 and top 12 of tubular member 10, between the bottom of sink 1 and threaded nut 5. Once nut 5 is threadably connected to threaded connection 6 of drain 2, sleeve element 26 is securely compressed between ball valve 20 and the fluid sealing system, i.e. O-ring 60 and washer 62. Fluid is thus prevented from leaking outside tubular member 10 or through ball valve 20 when it is in the closed position.

Figure 1:
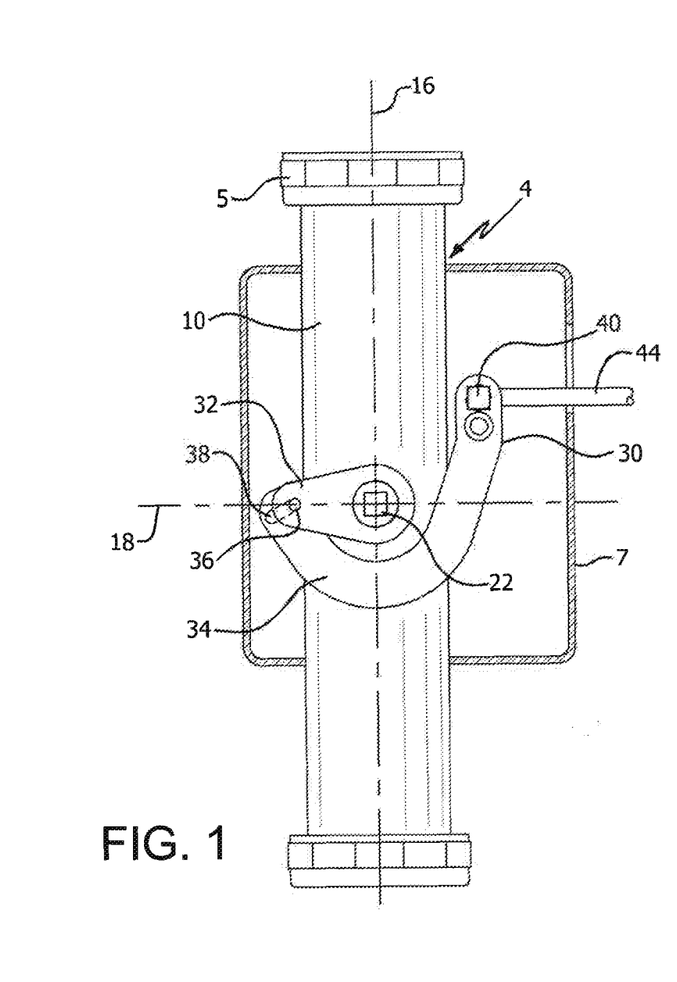
FIG. 1 is a partial cross-sectional view of the drain assembly system of the present invention utilized in a tailpiece, in the open position.
Figure 2:
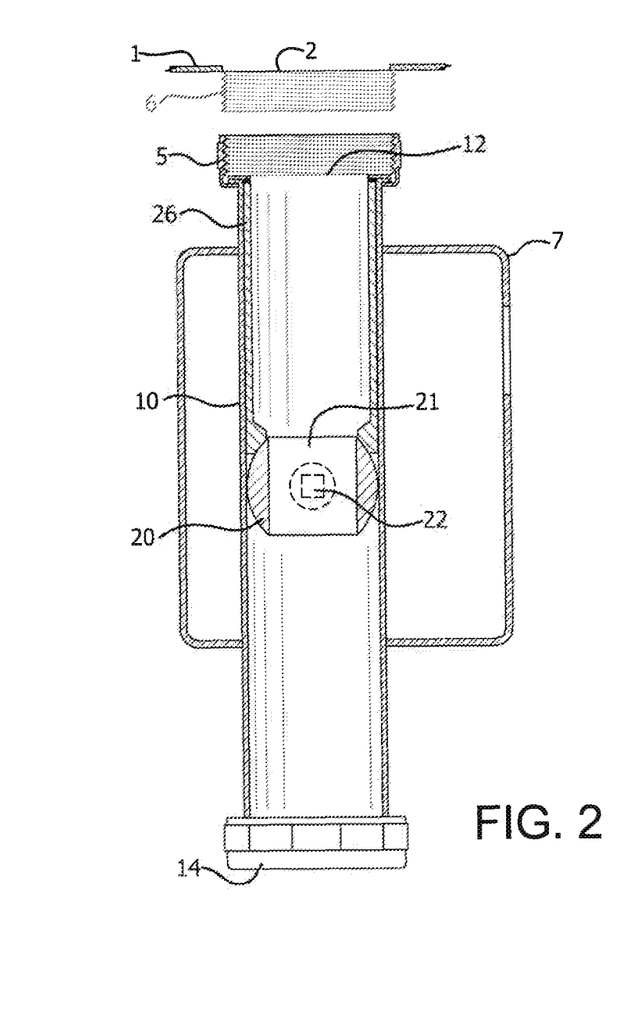
FIG. 2 is a full cross-sectional view of the drain assembly system of the present invention utilized in a tailpiece, in the open position.
Figure 3:
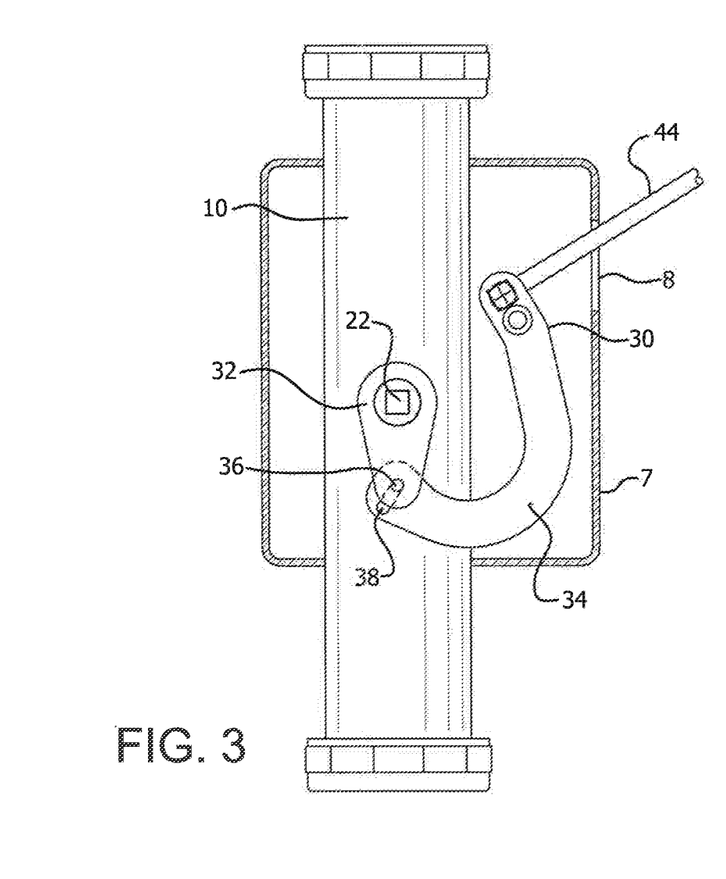
FIG. 3 is a partial cross-sectional view of the drain assembly system of the present invention in a tailpiece, in the closed position.
Figure 4:
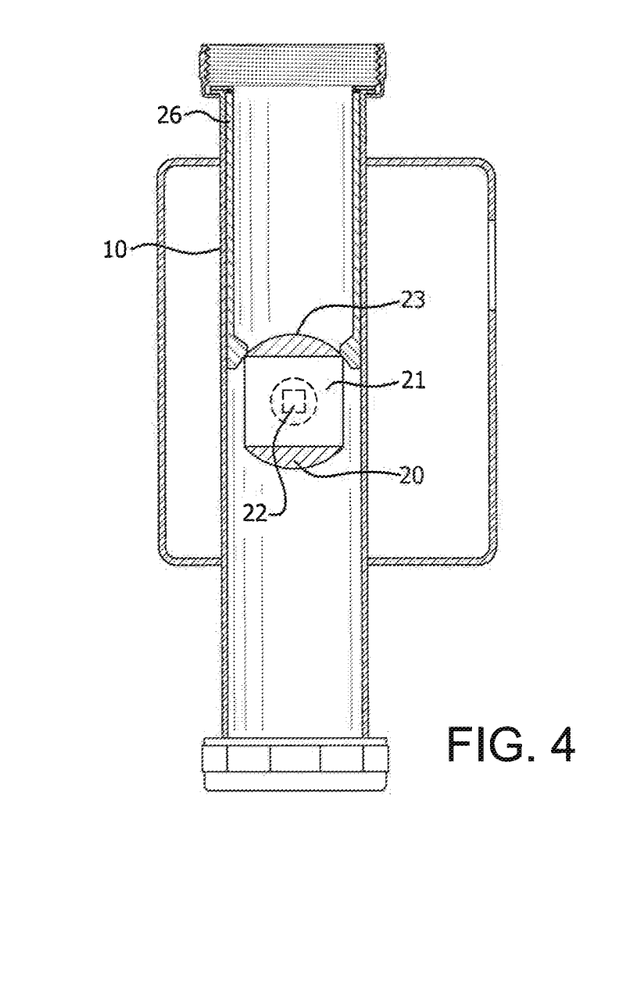
FIG. 4 is a full cross-sectional view of the drain assembly system of the present invention in a tailpiece, in the closed position.
Figure 5:
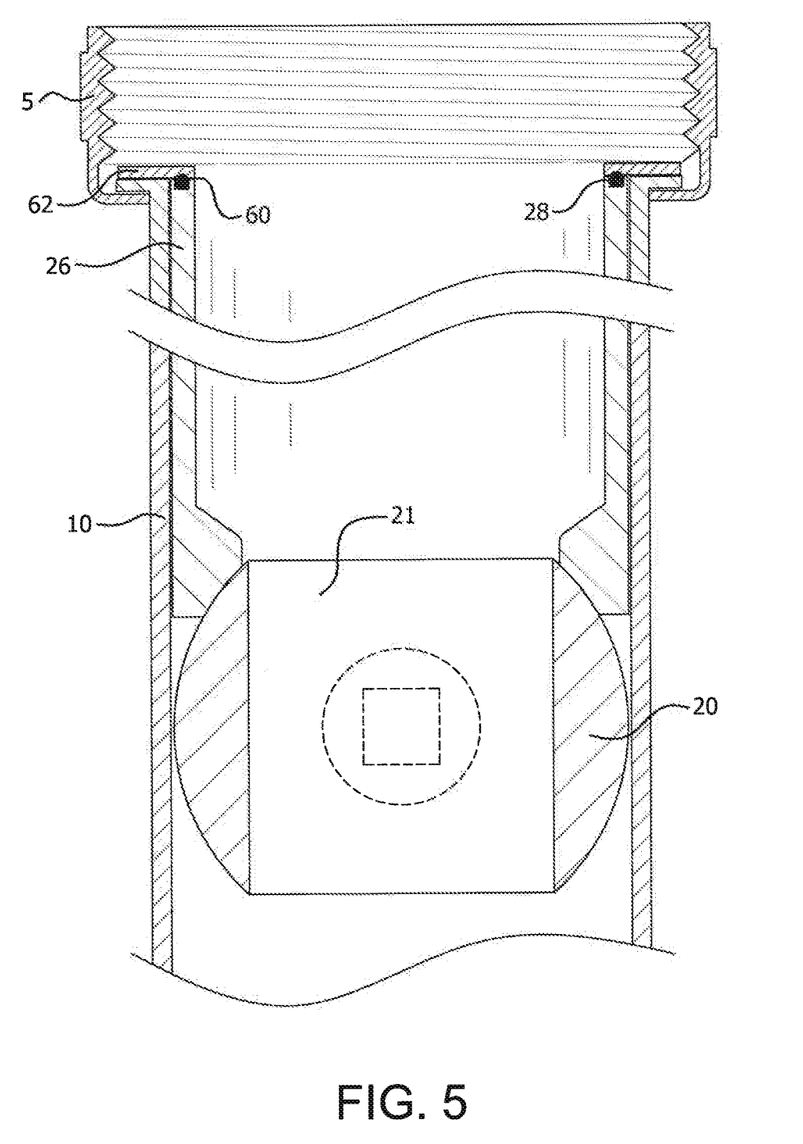
FIG. 5 is a close-up view of the drain assembly system of the present invention taken from FIG. 2.
Figure 6:
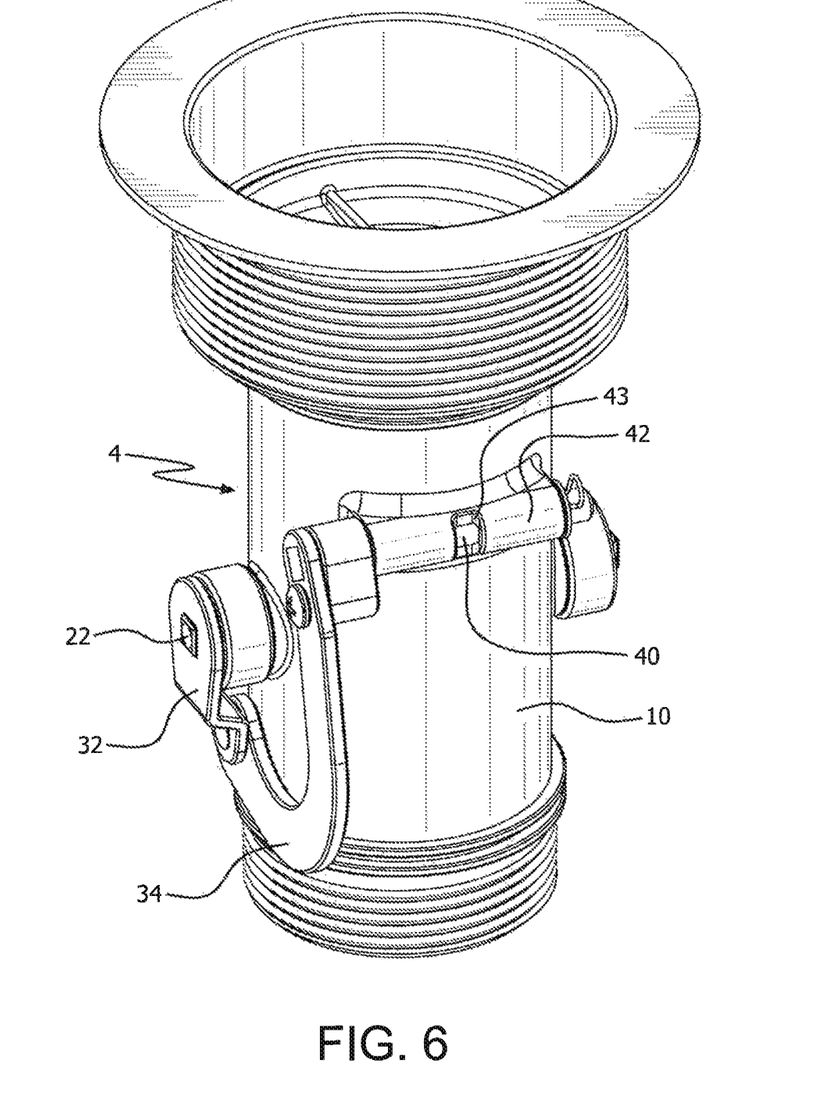
FIG. 6 shows a rear perspective view of the tailpiece of the present invention.
Figure 7:
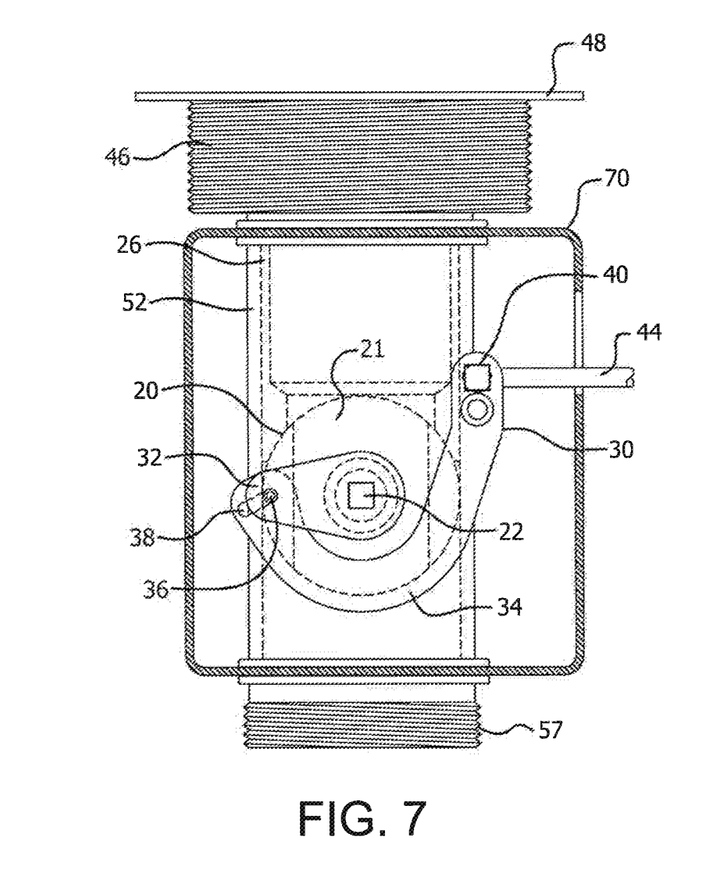
FIG. 7 is a partial cross-sectional view of the drain assembly system of the present invention utilized as an originally installed component of a sink drain, in the open position.
Figure 8:
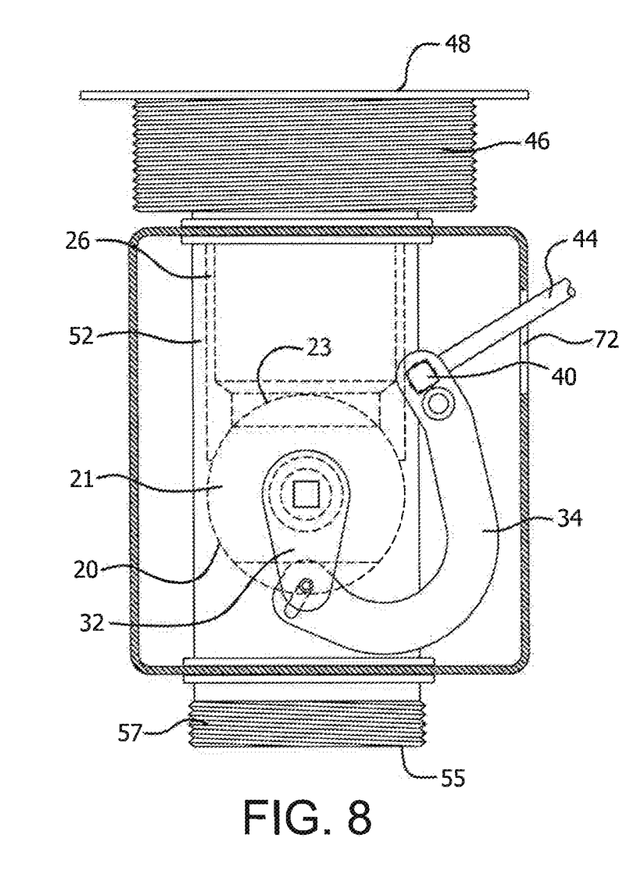
FIG. 8 is a partial cross-sectional view of the drain assembly system of the present invention utilized as an originally installed component of a sink drain, in the closed position.
Figure 9:
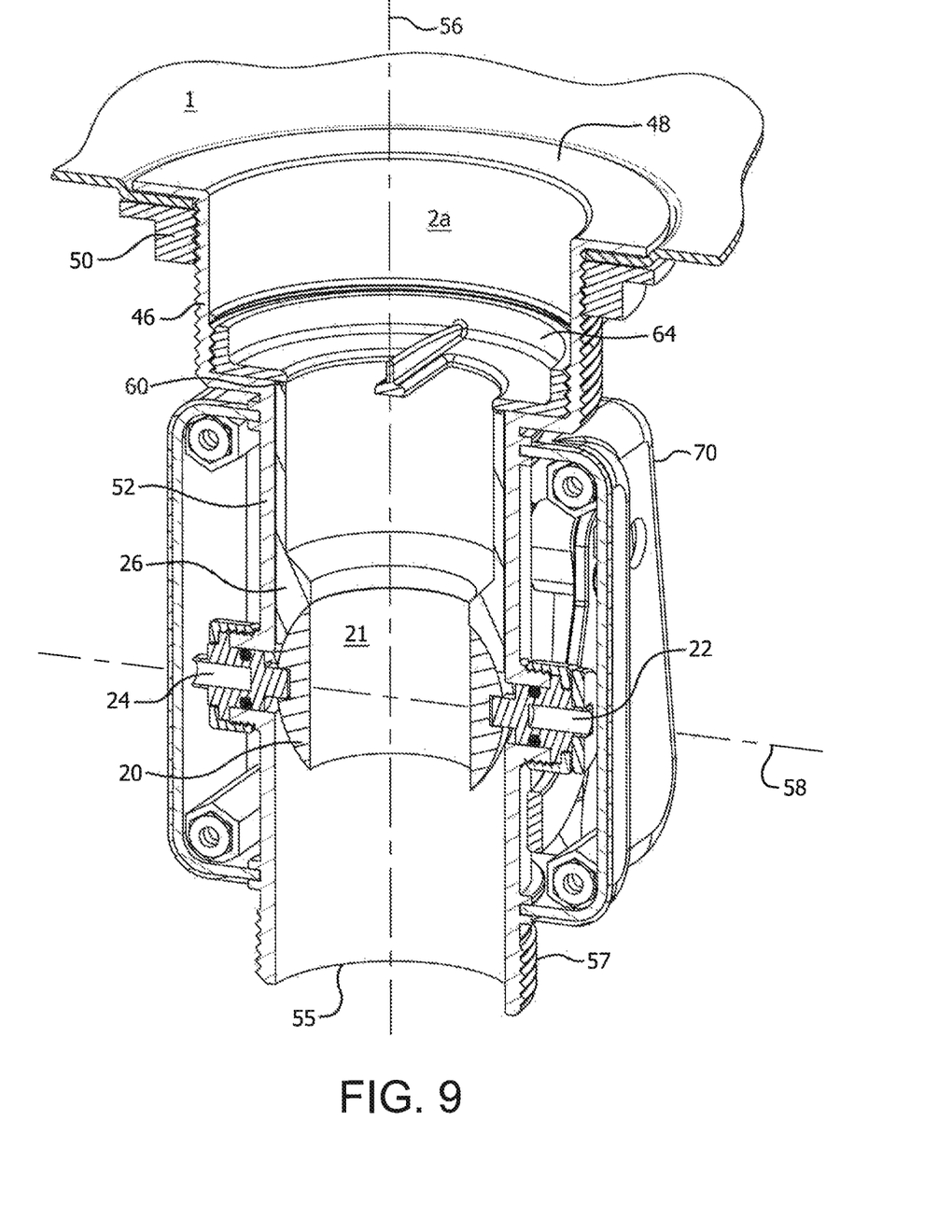
FIG. 9 is a cross-sectional view of the drain assembly system of the present invention showing internal components of the system with the ball valve in the open position.
Figure 10:
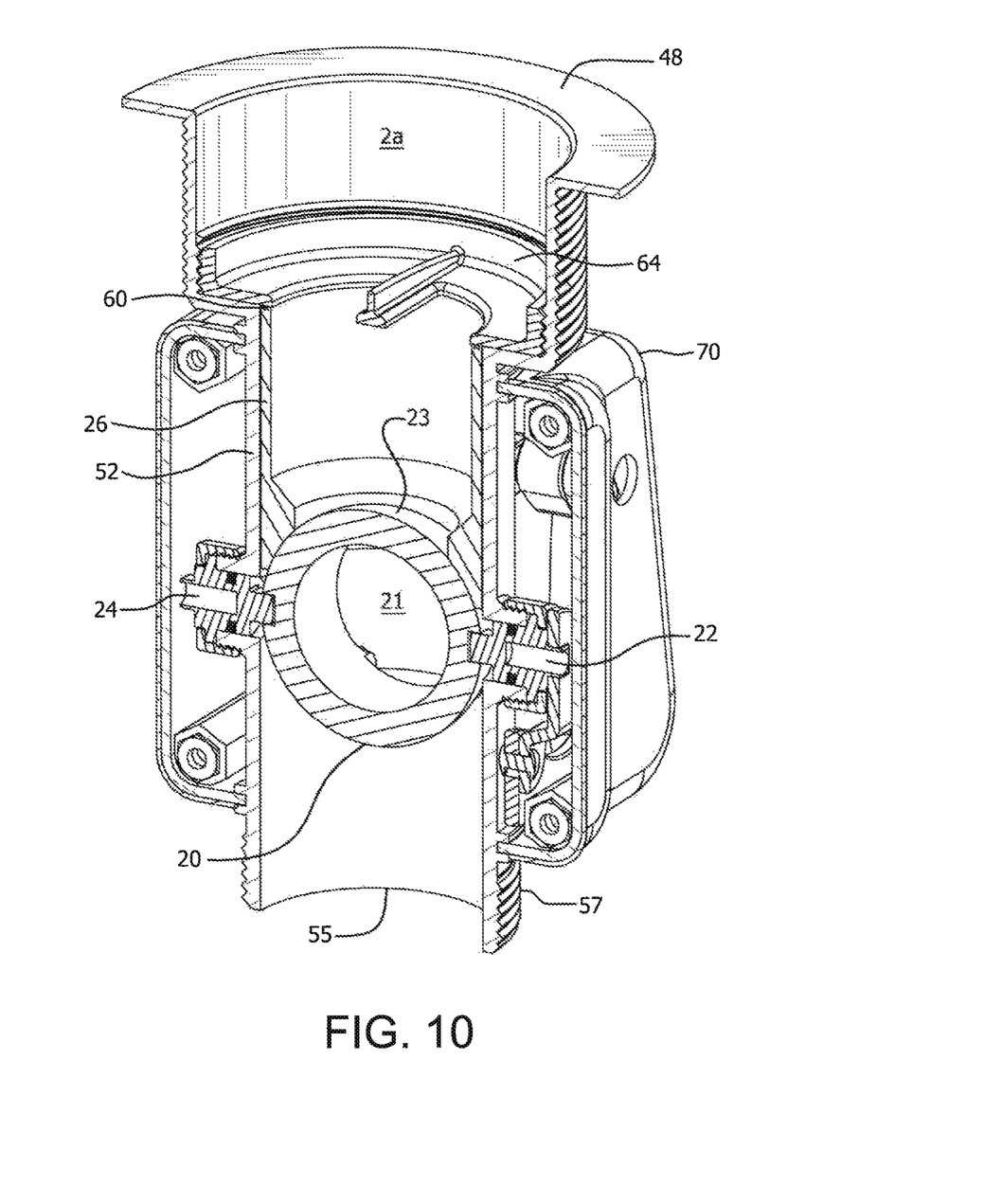
FIG. 10 is a cross-sectional view of the drain assembly system of the present invention showing internal components of the system with the ball valve in the closed position.

FIGS. 7-10 show the unique system of the present invention utilized as an originally installed assembly of a sink drain. As best seen in FIG. 9, this assembly is a part of sink drain 2a formed by threaded connector 46 extending down from sink drain plate 48. The entire unit is secured to sink 1 by locking nut 50. Similar to the tailpiece add-on 4, tubular member 52 is an elongated cylindrical pipe extended by threaded connector 46. Tubular member 52 has open bottom 54, longitudinal vertical axis 56 and horizontal axis 58, perpendicular to the vertical axis. Threaded connector 57 is provided for attachment to the additionally required, normal drainage piping. Also, as previously described with regard to the tailpiece add-on 4, the assembly comprises tubular ball valve 20, linkage assembly 30 and actuator arm 44. Linkage assembly 30 comprises linkage crank member 32, fixedly attached to rotatable shaft 22, U-shaped linkage arm 34, pin 36 within slot 38 and linkage shaft 40. Linkage assembly 30 operates by means of actuator arm 44, as previously described with regard to tailpiece add-on 4. Housing 70 encloses the assembly.

The fluid sealing system again comprises the use of O-ring 60 with the addition of bottom drain member 64 threadably secured to threaded connector 46 in order to compress sleeve element 26 between ball valve 20 and the bottom drain member. As previously described, this prevents leakage from the sink drain through ball valve 20 or into housing 70.

In both the add-on tailpiece and originally install sink assemblies, actuator arm 44 is designed to be vertically raised at an angle of less than 90° from its horizontal position and optimally at an angle between 30° and 45°, so that it can be used in small areas, usually the minimal space under the sink. The extent of movement of actuator arm 44 can be controlled either by the use of a small tab extending from ball valve 20 which contacts the inner surface of tubular member 10, or by limiting the angular distance the arm be moved. For instance, by the size of the slotted openings 8 and 72, in housings 7 and 70, through which actuation arm 44 extends or by providing shroud 42 over linkage shaft 40, with an opening 43 of a specific size designed to allow limited movement of the arm in relation to the linkage shaft.

Figure 11:
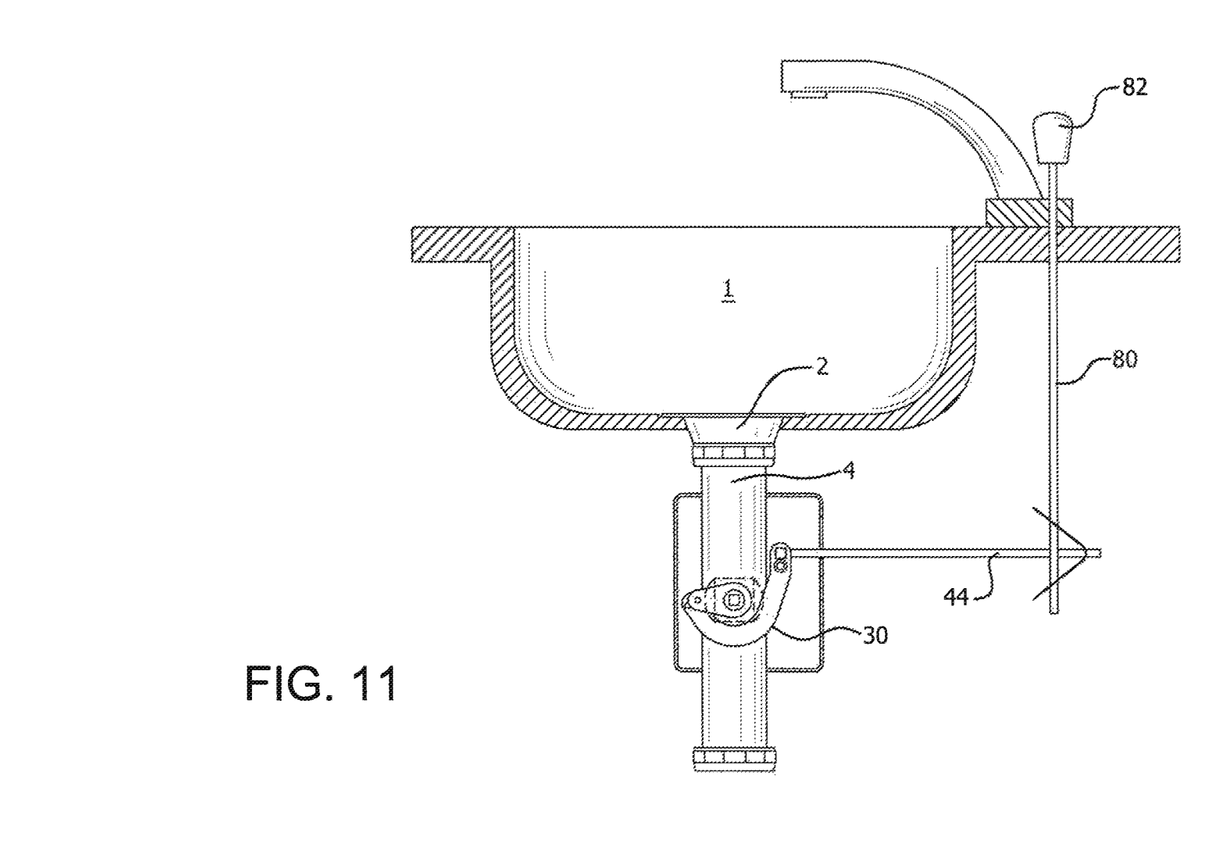
FIG. 11 is a view of the drain assembly system of the present invention with its tailpiece installed beneath a sink, showing the manner of its operation. The view shows the system in an open position.
Figure 12:
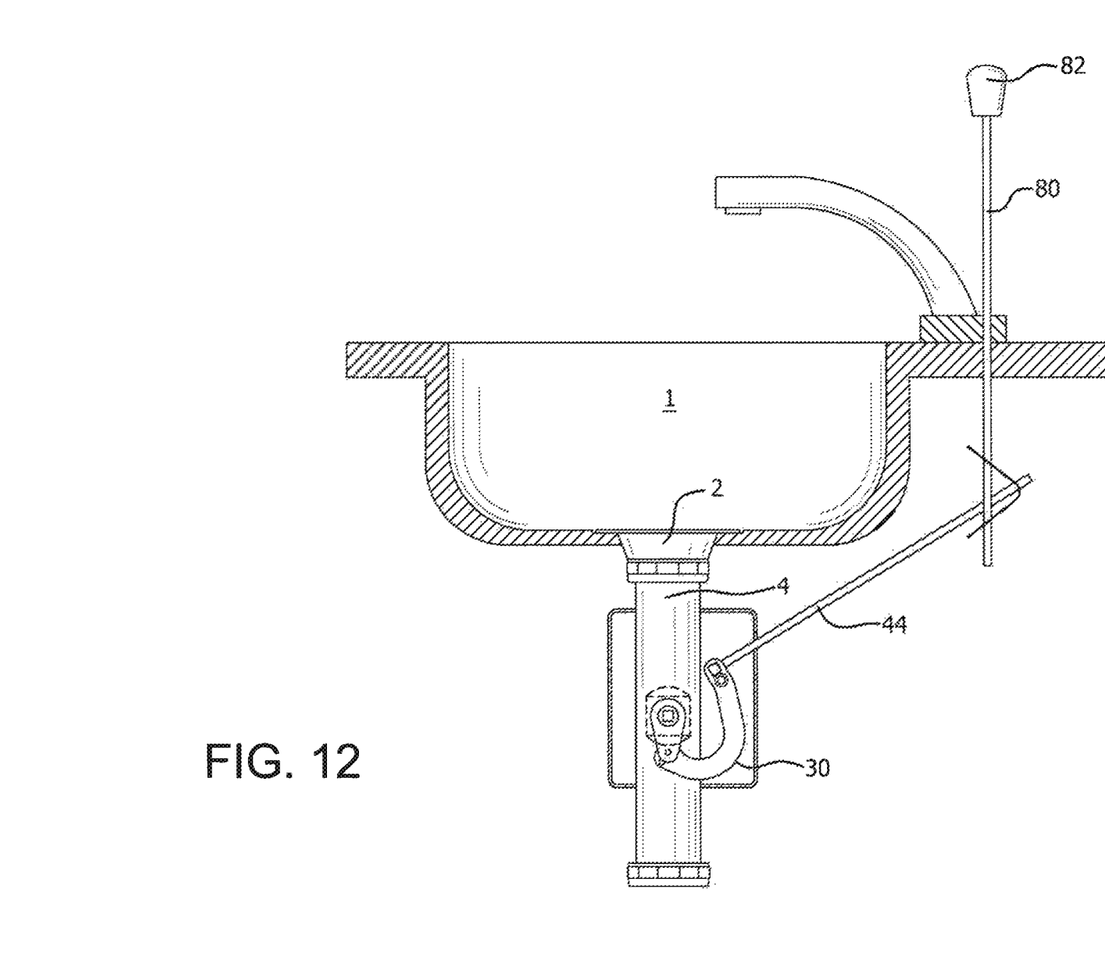
FIG. 12 is a view of the drain assembly system of the present invention similar to FIG. 10, depicting the system in a closed position.

Manual actuation of the system can be accomplished by control rod 80, pivotally connected to actuator arm 44. As seen in FIG. 11, control knob 82, located above sink 1 and connected to rod 80, is pulled upward, actuator arm 44, pivotably mounted to rod 80, is raised the appropriate less than 90° angle, actuating linkage assembly 30 to open ball valve 20, as previously described. By the same token, pushing down on handle 82 lowers actuator arm 44 back to its horizontal position to close ball valve 20.

Actuator arm 44 can also be controlled by a cable operating system utilizing a cable secured at one end of the arm. The cable could then be secured by brackets or other means to housing 7 and extend up to knob 82, which controls the movement of the cable, thereby allowing arm 44 to be raised and lowered.

The raising and lowering of arm 44 can also be controlled remotely by a servo-motor linked to the arm. Appropriate input to the motor would actuate the motor to move the arm 44 up and down.

Other equivalent means to control the movement of arm 44 would include a rotary handle secured to the after end of the arm, mounted under the sink, employed primarily for industrial use.

The means to control actuation arm 44 described herein are not to be considered so restricted. Equivalent actuation arm control means are contemplated for use with the present invention.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A drain control system for sinks and other fluid retaining vessels, each having a drain opening, said system comprising:
   an elongated tubular member comprising an open top and open bottom and having a longitudinal vertical axis and a horizontal axis perpendicular to the vertical axis;
   connection means at the top of the tubular member for attaching the tubular member to a sink, below the drain opening;
   a ball valve being rotatably mounted between a closed position and an open position within the tubular member, said ball valve having a centrally extending through channel;
   a sleeve element located within the tubular member, said sleeve element at all times seated up against the ball valve and extending up from the ball valve adjacent to and along the internal surface of the tubular member;
   rotatable shafts mounting and supporting the ball valve to the tubular member;
   a linkage assembly connected to one of the rotatable shafts for rotating the shaft and ball valve mounted thereon; and
   an actuator arm connected to the linkage assembly and extending outward from the tubular member and having vertically upward movement such that the arm is raised vertically from a horizontal position perpendicular to the vertical axis of the tubular member, to a raised position located at an angle less than ninety degrees from the horizontal position, whereby when the arm is in the horizontal position, the central channel of the ball valve is in parallel alignment with the vertical axis of the tubular member and the ball valve is set and maintained in the open position, and when the arm is in the raised position at an angle less than ninety degrees from the horizontal, the upward movement of the arm actuates the linkage assembly to rotate the ball valve such that its central channel is aligned parallel to the horizontal axis, to set and maintain the ball valve in the closed position.

2. The drain control system as in claim 1 further comprising a fluid sealing system located at the bottom of the drain and above the sleeve element for preventing fluid from leaking through to the exterior of the tubular member or around the ball valve.

3. The drain control system as in claim 2 wherein the sleeve element is, at all times, securely compressed between the ball valve and the fluid sealing system.

4. The drain control system as in claim 1 wherein the linkage assembly comprises a first link member rotatably connected to one of the rotatable shafts, a second link member rotatably connected to the first link member, and a horizontal shaft link member rotatably connected to the second link member.

5. The drain control system as in claim 4 wherein the arm is attached to the horizontal shaft link member, the arm rotation of the shaft link member about an axis parallel to the horizontal axis of the tubular member rotates the ball valve between the ball valve between the open position to the closed position.

6. The drain control system as in claim 1 wherein the tubular member is a tailpiece pipe member extending below the drain opening of a sink.

7. The drain control system as in claim 1 wherein the tubular member is the primary drain control assembly extending below the drain opening of a sink.

8. The drain control system as in claim 1 wherein the arm has two ends, one end connected to the linkage assembly and the second end pivotably connected to a rod extending up from the arm through the exterior of the fluid holding container, whereby vertical movement of the rod controls the movement of the arm and the movement of the ball valve between its open and closed positions.

9. The drain control system as in claim 2 wherein the fluid sealing system comprises an O-ring and washer element located above the O-ring, such that the sleeve element is securely compressed between the ball valve and the O-ring and washer element.

10. The drain control system as in claim 2 wherein the fluid sealing system comprises an O-ring and a bottom drain member located above the O-ring, such that the sleeve element is securely compressed between the ball valve and the bottom drain member.

11. The drain control system as in claim 1 wherein said raised position is an angle between 30° and 45° from the horizontal position.

* * * * *